United States Patent
Tseng

(10) Patent No.: US 7,633,931 B2
(45) Date of Patent: Dec. 15, 2009

(54) METHOD FOR DYNAMICALLY HANDLING THE DATA PATH OF A WIRELESS IP PHONE

(75) Inventor: Ruey-Yuan Tseng, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 631 days.

(21) Appl. No.: 11/435,340

(22) Filed: May 15, 2006

(65) Prior Publication Data
US 2007/0070984 A1    Mar. 29, 2007

(30) Foreign Application Priority Data
Sep. 29, 2005   (TW) .............................. 94133959 A

(51) Int. Cl.
*H04L 12/66*   (2006.01)
(52) U.S. Cl. ..................... 370/352; 370/338; 370/437; 370/355; 370/493
(58) Field of Classification Search ................. 370/352, 370/338, 437, 401; 455/456.2, 560, 445, 455/466
See application file for complete search history.

(56) References Cited

U.S. PATENT DOCUMENTS

2005/0190782 A1*  9/2005  Buckley et al. ............. 370/437
2006/0077957 A1*  4/2006  Reddy et al. ................ 370/352
2006/0205436 A1*  9/2006  Liu et al. ..................... 455/560
2006/0217132 A1*  9/2006  Drummond-Murray et al. .. 455/456.2
2007/0127442 A1*  6/2007  O'Neil et al. ............... 370/352

FOREIGN PATENT DOCUMENTS

EP          1463361 A2 *  9/2004

* cited by examiner

*Primary Examiner*—David Q Nguyen
(74) *Attorney, Agent, or Firm*—Quintero Law Office

(57) ABSTRACT

A method for dynamically handling the data path of a wireless IP phone is provided. The method comprises establishing a first communication link between the wireless IP phone and a wireless local area network (WLAN), establishing a second communication link between the wireless IP phone and a general packet radio service (GPRS) network, establishing a conversation session between the wireless IP phone and a second IP phone via a voice over internet protocol (VoIP) through the first or second communication link, determining whether the data path of the conversation session passes through the first or the second communication link according to a signal strength of the first communication link, and exchanging a plurality of packets of the conversation session through the data path.

17 Claims, 4 Drawing Sheets

| IP routing table | | | |
|---|---|---|---|
| Destination address ~402 | Gateway address ~404 | Network mask ~406 | Communication module ~408 |
| 10.1.1.0 | 0.0.0.0 | 255.255.254.0 | GPRS module |
| 10.1.2.0 | 0.0.0.0 | 255.255.254.0 | WLAN module |
| 0.0.0.0 | 10.1.2.254 | 0.0.0.0 | WLAN module |

METHOD FOR DYNAMICALLY HANDLING THE DATA PATH OF A WIRELESS IP PHONE

BACKGROUND OF THE INVENTION

1. Field of the Invention

The invention relates to a wireless IP phone, and more particularly to a wireless IP phone supporting both a wireless local area network (WLAN) standard and the General Packet Radio Service (GPRS) standard.

2. Description of the Related Art

The Wi-Fi standard comprises a series of standards for wireless local area network, including the IEEE 802.11a and 802.11b standards. Because of the prevalence of the wireless local area network, the Wi-Fi standard is extensively adopted by industry.

Many standards for transmitting audio data over the Internet have been established. The control signals of ordinary IP phones are exchanged through H.323, SIP, or MGCP standards, and the voice data of ordinary IP phones is exchanged through the user datagram protocol (UDP) of the TCP/IP protocol. The control signal packets and voice data packets of a wireless IP phone are exchanged with an access point of a WLAN through one physical layer standard of the Wi-Fi standards. However, the user of a wireless IP phone often moves during a telephone conversation. The physical layer connection between the access point of the WLAN and the wireless IP phone tends to break off if the user moves beyond a distance of 300 feet from the access point if the connection is made through the IEEE 802.11b standard.

Because the mobile communication is prevalent all over the world, the Global System for Mobile communication (GSM) networks have been established. The GSM network, however, is a circuit switched network, and cannot be used to directly transfer Internet data packets. Thus, a General Packet Radio Service (GPRS) technique is provided to transfer Internet packets through GSM networks.

A data packet of a IP phone can be transmitted through different physical layer standards. Thus, the voice data packets and the control signal packets of a wireless IP phone can be transmitted through a WLAN complying with Wi-Fi standards or the GPRS network. Because the physical layer connection between the access point of the WLAN and the wireless IP phone tends to break off when a user moves, the invention substitutes the WLAN with the GPRS network when the signal strength of the Wi-Fi physical layer connection is weak, and the voice data packets and the control signal packets of the wireless IP phone can still be transmitted through the GPRS network.

BRIEF SUMMARY OF THE INVENTION

A method for dynamically handling the data path of a wireless IP phone is provided. A first communication link between the wireless IP phone and a wireless local area network (WLAN) is established. A second communication link between the wireless IP phone and a general packet radio service (GPRS) network is then established. A conversation session between the wireless IP phone and a second IP phone is then established via the voice over internet protocol (VoIP) through the first or second communication link. The data path of the conversation session is then determined to pass through the first or the second communication link according to a signal strength of the first communication link. A plurality of packets of the conversation session are then exchanged through the data path.

An IP telephony network system is also provided. The IP telephony network system comprises a wireless local area network (WLAN) coupled to a backbone network, a general packet radio service (GPRS) network coupled to the backbone network, and a second IP phone coupled to the backbone network.

The IP telephony network system also comprises a wireless IP phone, connecting to the WLAN through a first communication link, connecting to the GPRS network through a second communication link, establishing a conversation session between the wireless IP phone and a second IP phone via a voice over internet protocol (VoIP) through the first or second communication link, determining whether the first or the second communication link is passed through by a data path of the conversation session according to a signal strength of the first communication link, and exchanging a plurality of packets of the conversation session through the data path.

A wireless IP phone is also provided. The wireless IP phone comprises a wireless local area network (WLAN) module for establishing a first communication link between the wireless IP phone and a WLAN, a general packet radio service (GPRS) module for establishing a second communication link between the wireless IP phone and a GPRS network, and a received signal strength indicator (RSSI) coupled to the wireless local area network (WLAN) module for detecting a signal strength of the first communication link. The wireless IP phone also comprises a core module, coupled to the WLAN module, the GPRS module and the RSSI, for establishing a conversation session between the wireless IP phone and a second IP phone via a voice over internet protocol (VoIP) through the first or second communication link, determining whether the first or the second communication link is passed through by the data path of the conversation session according to the signal strength, and exchanging a plurality of packets of the conversation session through the data path.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 4 is an IP routing table 400 of the wireless IP phone 100 according to the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
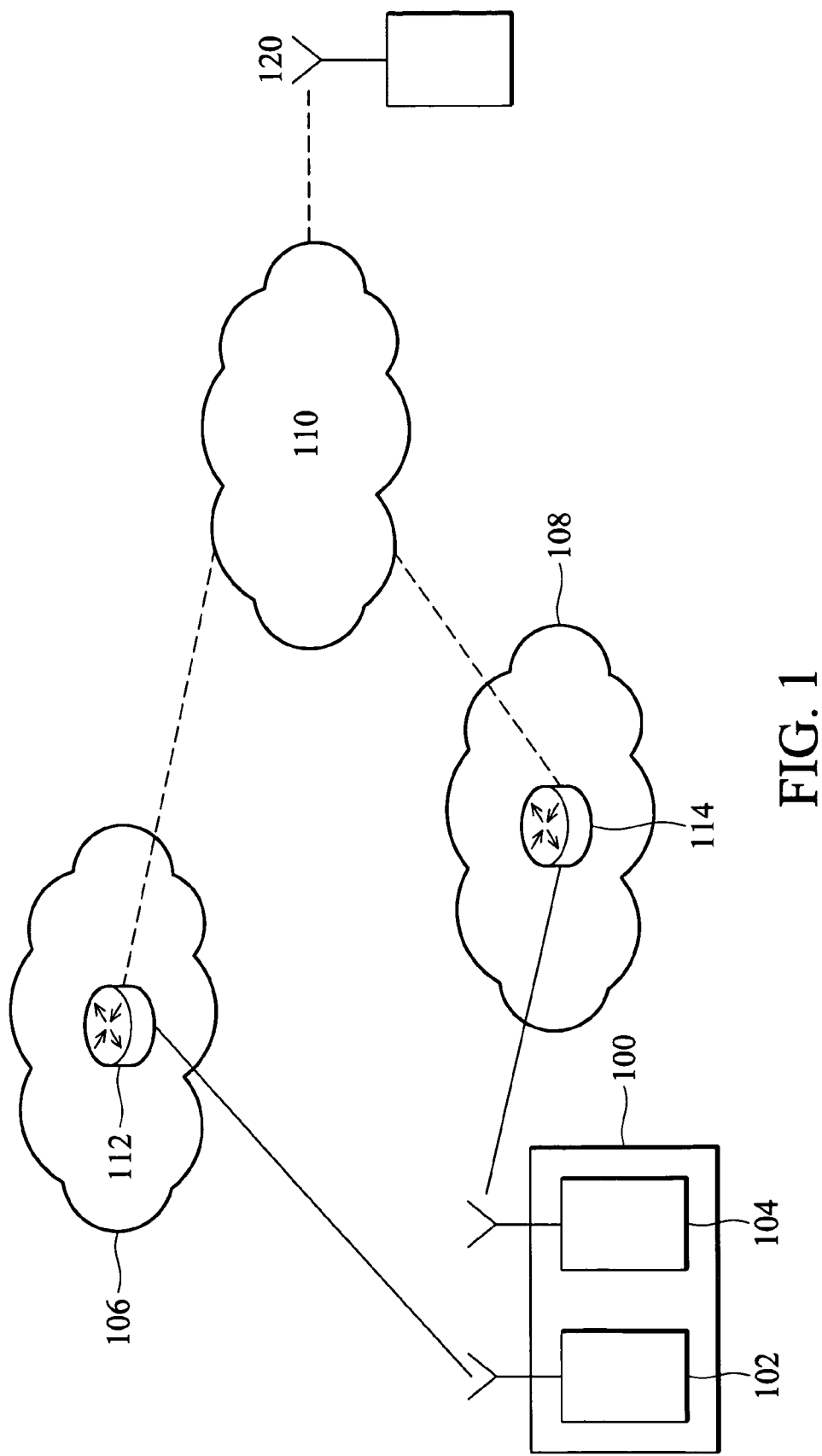
FIG. 1 shows an IP telephony network system according to the invention.

FIG. 1 shows an IP telephony network system according to the invention. A wireless IP phone 100 includes a WLAN module 102 processing WLAN signals and a GPRS module 104 processing GPRS signals. The wireless IP phone 100 establishes a network connection with the WLAN 106 through the WLAN module 102. The WLAN 106 is an IEEE 802.11a network, an IEEE 802.11b network; or an IEEE 802.16 series network. The wireless IP phone 100 also establishes a network connection with the GPRS network 108 through the GPRS module 104. Both the WLAN 106 and the GPRS network 108 connect to the backbone network 110. The backbone network 110 may be the Internet. Another IP phone 120 is also connected to the backbone network 110. Thus, after the WLAN module 102 connects with the WLAN 106, the wireless IP phone 102 can establish a first network link with the IP phone 120 and exchange the control packets and voice data packets of a conversation session through the first network link. Accordingly, after the GPRS module 104 connects with the GPRS network 108, the wireless IP phone 102 can establish a second network link with the IP phone 120 and exchange the control packets and voice data packets of a conversation session through the second network link.

The WLAN 106 includes a router 112. When the WLAN 106 receives a packet, the router 112 delivers the packet to an appropriate network connected via the WLAN 106 to guide the packet to its destination. Thus, when the WLAN 106 receives a packet from the wireless IP phone 100, the router 112 delivers the packet to the backbone network 110 for transmission to the IP phone 120, and when the WLAN 106 receives a packet of the IP phone 120 from the backbone network 110, the router 112 delivers the packet to the WLAN module 102 of the wireless IP phone 100.

The GPRS network 108 includes a gateway 114. When the GPRS network 108 receives a packet, the gateway 114 delivers the packet to an appropriate network connected to the GPRS network 108 to guide the packet to its destination. Thus, when the GPRS network 108 receives a packet from the wireless IP phone 100, the gateway 114 delivers the packet to the backbone network 110 for transmission to the IP phone 120, and when the GPRS network 108 receives a packet of the IP phone 120 from the backbone network 110, the gateway 114 delivers the packet to the GPRS module 104 of the wireless IP phone 100. The gateway 114 may be a Gateway GPRS. Support Node (GGSN) of the GPRS network 108.

Figure 2:
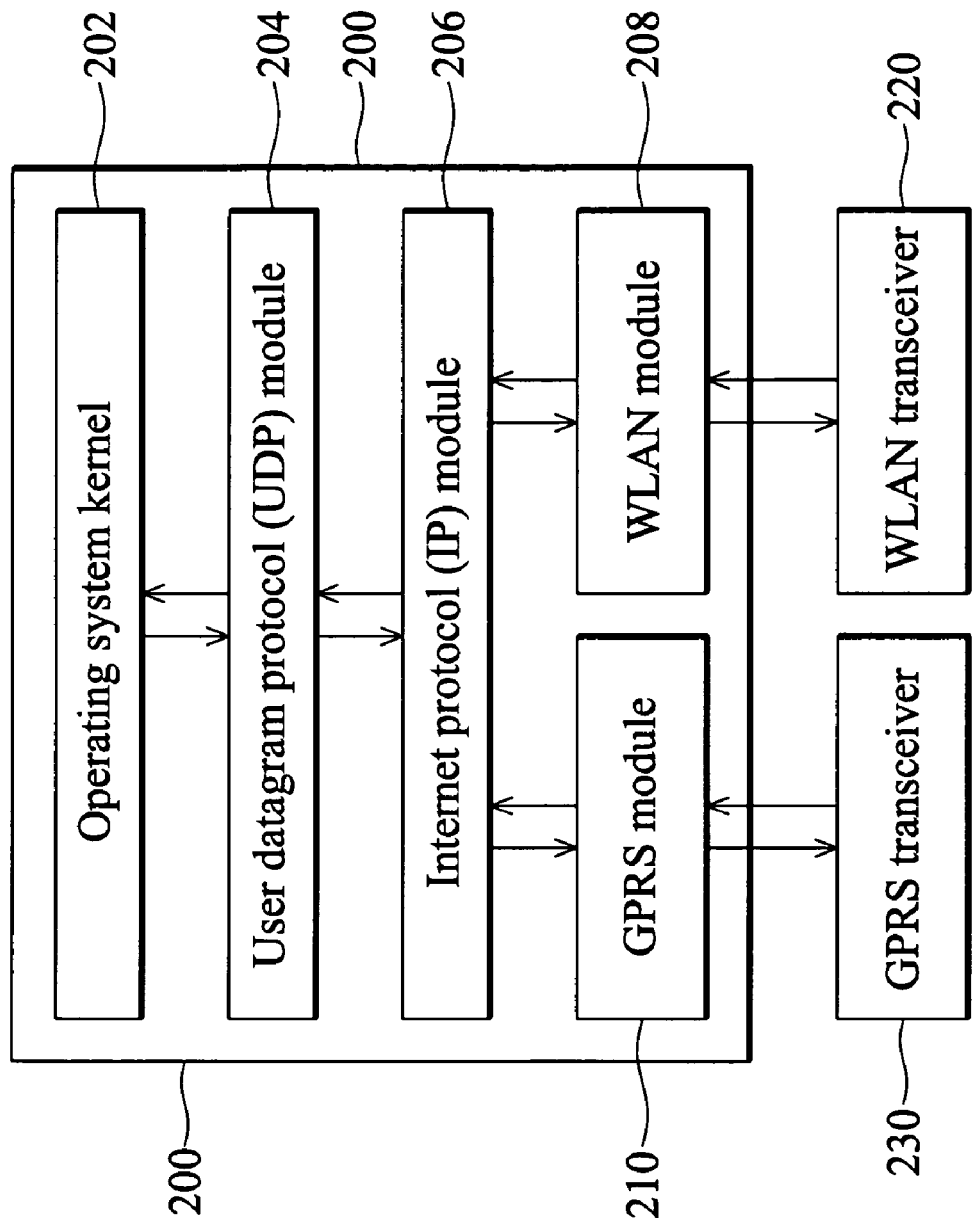
FIG. 2 is a block diagram of a core module of the wireless IP phone 100 according to the invention.

FIG. 2 is a block diagram of a core module 200 of the wireless IP phone 100 according to the invention. The core module 200 controls another hardware component of the wireless IP phone 100, such as the GPRS transceiver 230 and the WLAN transceiver 220. The core module 200 includes an operating system kernel 202 handling all program routines executed by the processor. A user of the wireless IP phone 100 is assumed to talk to a called party of the IP phone 120 through a conversation session link established through the backbone network 110. A microphone of the wireless IP phone 100 receives the voice signal. The voice signal is sampled and compressed by a digital signal processing (DSP) module and becomes voice data. The voice data is then delivered to the core module 200.

There are two kinds of data exchanged through the conversation session link, the voice data of the user and the control signal used to establish a conversation session link between the wireless IP phone 100 and the IP phone 120. A UDP header is first appended to the voice data of the user by the UDP module 204 to transform the voice data into UDP format data. The voice data is then segmented by the IP module 206 into a series of data segments and transformed into IP packets. The UDP module 204 and the IP module 206 respectively correspond to the third and fourth layer protocols of the TCP/IP protocols.

The voice data is then delivered to the WLAN module 208 or the GPRS module 210 according to the data path currently used by the wireless IP phone 100. If the current data path passes through the WLAN 106, the voice data is delivered to the WLAN module 208 which controls the WLAN transceiver 220 to send the voice data packets to the WLAN 106. If the current data path passes through the GPRS network 108, the voice data is delivered to the GPRS module 210 which controls the GPRS transceiver 230 to send the voice data packets to the GPRS network 108.

Accordingly, the IP phone 120 may also send a voice packet of the called party to the wireless IP phone 110. If the current data path used by the wireless IP phone 100 passes through the WLAN 106, the packet will be received by the WLAN transceiver 220, and the packet is then returned to the voice data after processed by the WLAN module 208, the IP module 206 and the UDP module 204. If the current data path used by the wireless IP phone 100 passes through the GPRS network 108, the packet will be received by the GPRS transceiver 230, and the packet is then returned to the voice data after processing by the GPRS module 210, the IP module 206 and the UDP module 204. The voice data is then decompressed by the DSP module of the wireless IP phone 100 to become a voice signal, and is then broadcast through a loudspeaker and heard by the user of the wireless IP phone 100.

Figure 3:
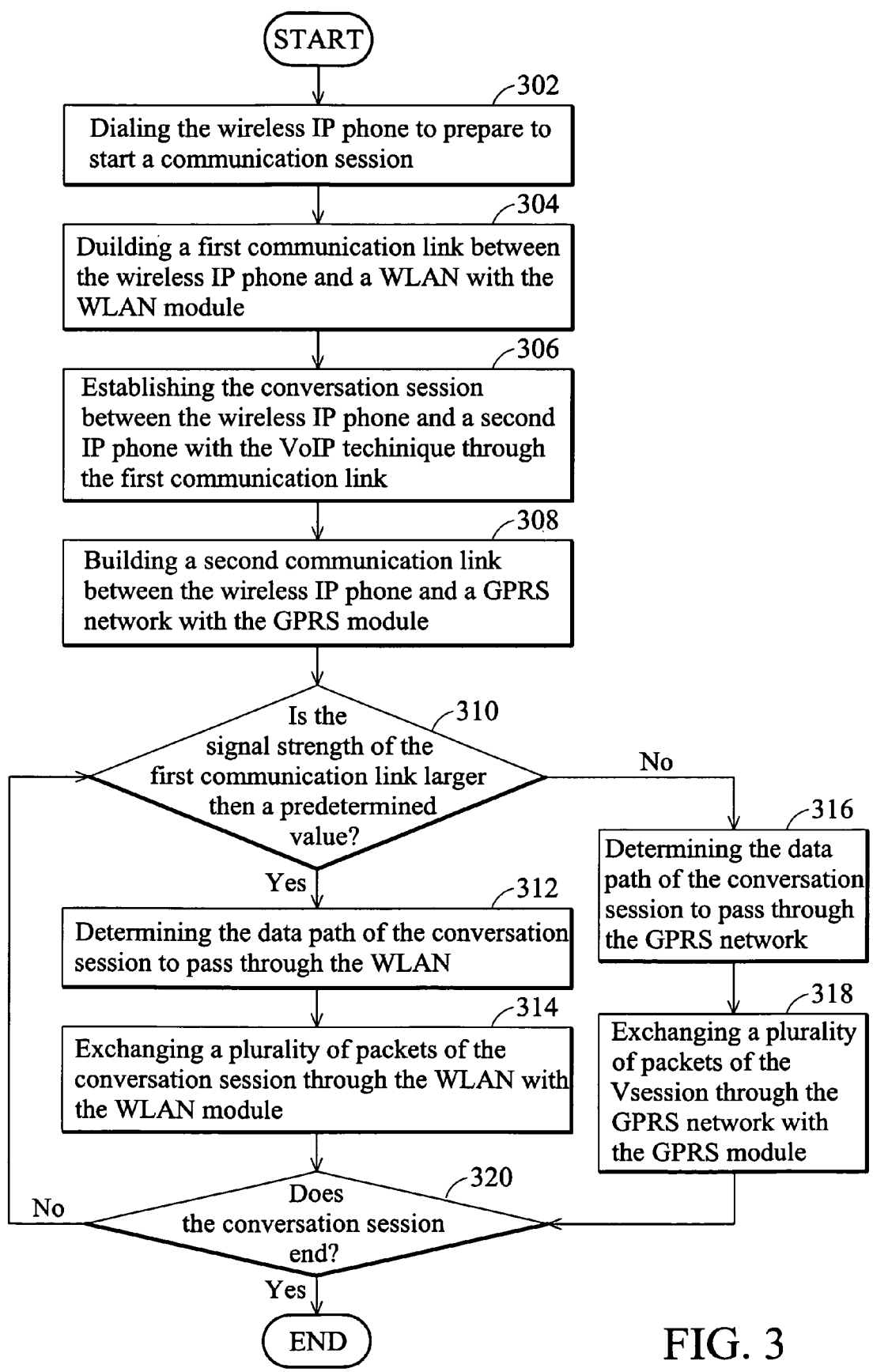
FIG. 3 is a flowchart of a method for dynamically handling the data path of the wireless IP phone according to the invention.

FIG. 3 is a flowchart of a method 300 for dynamically handling the data path of the wireless IP phone 100 according to the invention. Method 300 is implemented by core module 200 of FIG. 2 to determine whether the WLAN 106 or the GPRS network 108 is passed through by the data path of packets of the wireless IP phone 100. The wireless IP phone 100 can be a personal computer (PC) with a IP telephony software installed and a wireless network interface card, a personal digital assistant (PDA) or a mobile phone which has both WLAN and GPRS communication functions. Accordingly, the IP phone 120 may also be a PC, a PDA or a mobile phone. The method 300 is illustrated by a situation in which the wireless IP phone 100 is a calling party, but the concept of method 300 can be applied to a situation in which the wireless IP phone 100 is a called party.

A user dials the wireless IP phone 100 to call the called party of the IP phone 120 in step 302. A first communication link between the wireless IP phone 100 and the WLAN 106 is established with the WLAN module 102 in step 304. The conversation session between the wireless IP phone 100 and the IP phone 120 is established via the Voice over Internet Protocol (VoIP) through the first communication link in step 306. A second communication link between the wireless IP phone 100 and the GPRS network 108 is established with the GPRS module 104 in step 308. The second communication link between the wireless IP phone 100 and the GPRS network 108 is always on during the entire conversation session. When the first communication link is used to transfer the packets of the conversation session, only a few control packets are exchanged between the GPRS network 108 and the wireless IP phone 100 to maintain the second communication link. Because the network provider of the GPRS network 108 charges the second communication link according to the amount of data exchanged through the second link, no extra fee is incurred by maintaining the second communication link.

The wireless IP phone 100 must determine whether the signal strength of the first communication link is greater than a predetermined value at a fixed interval in step 310. The signal strength of the first communication link can be detected with a received signal strength indicator (RSSI). The predetermined value is set according to the signal strength threshold guaranteeing the reliability of the first communication link between the WLAN 106 and the wireless IP phone 100. For example, the predetermined value may be 33% or 60 dB RSSI. If the signal strength of the first communication link is greater than the predetermined value in step 310, the data path of the conversation session is determined to pass through the WLAN 106 in step 312, and a plurality of packets of the conversation session are then exchanged through the WLAN 106 with the WLAN module 102 in step 314. Otherwise, if the signal strength of the first communication link is less than the predetermined value in step 310, the data path of the conversation session is determined to pass through the GPRS network 108 in step 316, and a plurality of packets of the conversation session are then exchanged through the GPRS network 108 with the GPRS module 104 in step 318. If the conversation session is continued in step 320, the wireless IP phone 100 continues checking the signal strength of the first communication link in step 310. Otherwise, the conversation session ends, and the first and the second communication links are broken off in step 320.

FIG. 4 is an IP routing table 400 of the wireless IP phone 100 according to the invention. Column 402 of table 400 is the destination address of packets, column 404 of table 400 is the gateway address, column 406 of table 400 is the network mask, and column 208 is the communication module used to transmit a data packet of the wireless IP phone 100. Row 410 corresponds to a situation in which the GPRS network 108 is selected as the data path of the wireless IP phone 100. The IP address and the network mask of the GPRS network 108 are assumed to be 10.1.1.x and 255.255.254.0 respectively. If the GPRS network 108 is selected as the data path, the destination address of a packet is 10.1.1.x. The result of an AND operation of the destination address 10.1.1.x and the network mask 255.255.254.0 is 10.1.1.0, and the packet is delivered to the GPRS module 104 to be transmitted. Row 412 corresponds to a situation in which the WLAN 106 is selected as the data path of the wireless IP phone 100. The IP address and the network mask of the WLAN 106 are assumed to respectively be 10.1.2.x and 255.255.254.0. If the WLAN 106 is selected as the data path, the destination address of a packet is 10.1.2.x. The result of an AND operation of the destination address 10.1.2.x and the network mask 255.255.254.0 is 10.1.2.0, and the packet is delivered to the WLAN module 102 to be transmitted.

Row 414 of table 400 indicates the default route. The network mask of default route is 0.0.0.0. If the destination address of a packet is a.b.c.d, the result of an AND operation of the destination address a.b.c.d and the network mask 0.0.0.0 is 0.0.0.0. Thus any packet of different destination address can be delivered according to the default route of row 414. After the data path is determined according to a signal strength of the first communication link in step 310 of method 300, the packets of the conversation session can be guided to the data path of the WLAN 106 or the GPRS network 108 by setting the gateway address corresponding to the default route of table 400. For example, if the data path of the conversation session is determined to pass through the WLAN 106 in step 312, the gateway address corresponding to the default route of table 400 is changed to be the IP address 10.1.2.254 of router 112 of the WLAN 106, and all packets delivered according to the default route are sent to the WLAN module 102 to be transmitted to the router 112 of the WLAN 106. Otherwise, if the data path of the conversation session is determined to pass through the GPRS network 108 in step 316, the gateway address corresponding to the default route of table 400 is changed to be the IP address 10.1.1.254 of gateway 114 of the GPRS network 108, and all packets delivered according to the default route are sent to the GPRS module 104 to be transmitted to the gateway 114 of the GPRS network 108.

The invention provides a method for dynamically handling the data path of a wireless IP phone. The data path of a conversation session of the wireless IP phone is determined according to a signal strength of a communication link between the wireless IP phone and a WLAN. When the signal strength is weak, the packets of the conversation session is delivered through a GPRS network to improve the communication reliability. Thus, the performance of the wireless IP phone is improved.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for dynamically handling the data path of a wireless IP phone, the method comprising:

establishing a first communication link between the wireless IP phone and a wireless local area network (WLAN);

establishing a second communication link between the wireless IP phone and a general packet radio service (GPRS) network;

establishing a conversation session between the wireless IP phone and a second IP phone via a voice over internet protocol (VoIP) through the first or second communication link;

detecting a signal strength of the first communication link;

when the signal strength is larger than a predetermined value, determining the data path of the conversation session to pass through the first communication link with lower penetrating ability;

when the signal strength is less than the predetermined value, determining the data path of the conversation session to pass through the second communication link with higher penetrating ability; and exchanging a plurality of packets of the conversation session through the data path.

2. The method as claimed in claim 1, wherein the WLAN and the GPRS network are coupled to the second IP phone through the Internet.

3. The method as claimed in claim 1, wherein the second communication link is always on during the entire conversation session.

4. The method as claimed in claim 1, wherein when the data path is determined to pass through the first communication link in the determining step, the method further comprises:

setting the gateway address of a default route of the wireless IP phone to be the IP address of a router of the WLAN;

delivering the plurality of packets from the wireless IP phone to the router through the first communication link;

forwarding the plurality of packets to the Internet through the WLAN; and forwarding the plurality of packets to the second IP phone through the Internet.

5. The method as claimed in claim 1, wherein when the data path is determined to pass through the second communication link in the determining step, the method further comprises:

setting the gateway address of a default route of the wireless IP phone to be the IP address of a gateway of the GPRS network;

delivering the plurality of packets from the wireless IP phone to the gateway through the second communication link;

forwarding the plurality of packets to the Internet through the GPRS network; and forwarding the plurality of packets to the second IP phone through the Internet.

6. The method as claimed in claim 1, wherein the signal strength of the first communication link is detected by a received signal strength indicator (RSSI).

7. The method as claimed in claim 1, wherein the WLAN is an IEEE 802.11a network, an IEEE 802.11b network, or IEEE 802.16 series network.

8. The method as claimed in claim 1, wherein the wireless IP phone is a personal computer, a personal digital assistant, or a cell phone.

9. An IP telephony network system, comprising:
a wireless local area network (WLAN), connected to a backbone network;
a general packet radio service (GPRS) network, connected to the backbone network;
a second IP phone, connected to the backbone network; and
a wireless IP phone, connected to the WLAN through a first communication link, connected to the GPRS network through a second communication link, establishing a conversation session between the wireless IP phone and a second IP phone via a voice over internet protocol (VoIP) through the first or second communication link, detecting a signal strength of the first communication link, determining the data path of the conversation session to pass through the first communication link with lower penetrating ability when the signal strength is greater than a predetermined value, determining the data path of the conversation session to pass through the second communication link with higher penetrating ability when the signal strength is less than the predetermined value, and exchanging a plurality of packets of the conversation session through the data path.

10. The IP telephony network system as claimed in claim 9, wherein the WLAN is an IEEE 802.11a network, an IEEE 802.11b network, or IEEE 802.16 series network.

11. The IP telephony network system as claimed in claim 9, wherein the second communication link is always on during the whole period of the conversation session.

12. The IP telephony network system as claimed in claim 9, wherein when the data path is determined to pass through the first communication link, the gateway address of a default route of the wireless IP phone is set to be the IP address of a router of the WLAN, the plurality of packets is then delivered from the wireless IP phone to the router through the first communication link and then forwarded to the second IP phone through the backbone network.

13. The IP telephony network system as claimed in claim 9, wherein when the data path is determined to pass through the second communication link, the gateway address of a default route of the wireless IP phone is set to be the IP address of a gateway of the GPRS network, the plurality of packets are then delivered from the wireless IP phone to the gateway through the second communication link and then forwarded to the second IP phone through the backbone network.

14. The IP telephony network system as claimed in claim 9, wherein the wireless IP phone is a personal computer, a personal digital assistant, or a cell phone.

15. A wireless IP phone, comprising:
a wireless local area network (WLAN) module, for establishing a first communication link between the wireless IP phone and a WLAN;
a general packet radio service (GPRS) module, for establishing a second communication link between the wireless IP phone and a GPRS network;
a received signal strength indicator (RSSI), coupled to the wireless local area network (WLAN) module, for detecting a signal strength of the first communication link; and
a core module, coupled to the WLAN module, the GPRS module and the RSSI, for establishing a conversation session between the wireless IP phone and a second IP phone with a voice over internet protocol (VoIP) technique through the first or second communication link, determining the data path of the conversation session to pass through the first communication link with lower penetrating ability when the signal strength of the first communication link is greater than a predetermined value, determining the data path of the conversation session to pass through the second communication link with higher penetrating ability when the signal strength of the first communication link is less than the predetermined value, and exchanging a plurality of packets of the conversation session through the data path.

16. The wireless IP phone as claimed in claim 15, wherein the second communication link is always on during the entire conversation session.

17. The wireless IP phone as claimed in claim 15, wherein the data path is determined to pass through the first communication link if the signal strength is greater than a predetermined value, and the data path is determined to pass through the second communication link if the signal strength is less than the predetermined value.

* * * * *